United States Patent
Schilling et al.

(10) Patent No.: US 9,807,053 B1
(45) Date of Patent: Oct. 31, 2017

(54) SYSTEM AND METHOD RELATED TO DOMAIN NAME TRACKING AND TRANSFER

(71) Applicant: Uniregistry, Corp., Grand Cayman (KY)

(72) Inventors: Frank Schilling, Georgetown (KY); Ryan Smith, Georgetown (KY)

(73) Assignee: Uniregistry, Corp. (KY)

( * ) Notice: Subject to any disclaimer, the term of this patent is extended or adjusted under 35 U.S.C. 154(b) by 328 days.

(21) Appl. No.: 14/839,756

(22) Filed: Aug. 28, 2015

Related U.S. Application Data

(60) Provisional application No. 62/044,016, filed on Aug. 29, 2014.

(51) Int. Cl.
*H04L 29/12* (2006.01)

(52) U.S. Cl.
CPC ........ *H04L 61/302* (2013.01); *H04L 61/1511* (2013.01); *H04L 61/1552* (2013.01); *H04L 61/1582* (2013.01)

(58) Field of Classification Search
CPC ............... H04L 61/302; H04L 61/1511; H04L 61/1552; H04L 61/1582
See application file for complete search history.

(56) References Cited

U.S. PATENT DOCUMENTS

| | | | |
|---|---|---|---|
| 6,421,737 B1 | 7/2002 | Stone | |
| 6,745,248 B1 | 6/2004 | Gardos | |
| 7,076,541 B1 | 7/2006 | Burstein | |
| 7,251,826 B1 | 7/2007 | Gardos | |
| 2001/0039543 A1* | 11/2001 | Mann | G06F 17/30876 |
| 2004/0199620 A1* | 10/2004 | Ruiz | H04L 29/12009 709/223 |
| 2005/0102354 A1* | 5/2005 | Hollenbeck | G06Q 10/02 709/203 |
| 2005/0144323 A1 | 6/2005 | Gardos | |
| 2007/0130284 A1 | 6/2007 | Stahura | |
| 2007/0271393 A1 | 11/2007 | Wong | |
| 2010/0325723 A1 | 12/2010 | Essawi | |
| 2011/0060950 A1 | 3/2011 | Waldron | |
| 2011/0289138 A1 | 11/2011 | Turakhia | |
| 2012/0174198 A1 | 7/2012 | Gould | |
| 2013/0080341 A1* | 3/2013 | Veeramachaneni | G06Q 50/184 705/310 |
| 2013/0174254 A1 | 7/2013 | Gould | |

FOREIGN PATENT DOCUMENTS

JP  2003141286  5/2003

* cited by examiner

*Primary Examiner* — Wing F Chan
*Assistant Examiner* — Billy H Ng
(74) *Attorney, Agent, or Firm* — Oppedahl Patent Law Firm LLC

(57) ABSTRACT

What is described is a system and method providing an improved customer experience for the Registrant. The Registrant is able to use a single interface to monitor multiple domain names as well as to transfer its domain names between Registrars. The single interaction with the single interface works out just as well and just as conveniently regardless of whether at the time a Registrant commences use of the system, a single Registrar happens to be handling all of the domain names, or whether each domain name is handled by a different Registrar.

14 Claims, 5 Drawing Sheets

SYSTEM AND METHOD RELATED TO DOMAIN NAME TRACKING AND TRANSFER

CROSS REFERENCE TO RELATED APPLICATIONS

This application is a non-provisional application claiming the benefits of provisional application No. 62/044,016 filed Aug. 29, 2014, the disclosure of which is hereby incorporated by reference for all purposes.

BACKGROUND

More than 192 million domain names have been registered through the interactions of Registries, Registrars, and Registrants. Registrants are the individuals or organizations that hold the right to use a specific domain name. Registrants gain this right by registering the domain name with a Registrar. Registrars are accredited by an international body called the Internet Corporation for Assigned Names and Numbers (ICANN) and compete with one another to get the business of Registrants. A Registry (or Registry Operator or Registry Administrator) as defined by ICANN is the authoritative, master database of all domain names registered in each Top Level Domain (TLD). Registries are the authority and central repositories for second level domain names registered in its TLD space. A Registry keeps the master database for the TLD and also generates the Domain Name System (DNS) "zone file" for the TLD which allows computers to route Internet traffic to and from top-level domains anywhere in the world. The data of TLD zone files describe a portion of the domain name space for specific TLDs and contain information needed to resolve domain names to Internet Protocol (IP) numbers.

Each top-level domain also has associated with it some other databases. One of these is a "Whois" database which gives contact information for each domain name in the top-level domain. Another is a database that keeps track (for the Registry) of the designated Registrar that is responsible for each second-level domain. Registries record and allow Registrars access to various attributes of a domain registration such as registration periods, ownership, assigned nameservers, and sponsoring Registrar.

What later may be referred to the Registrar System is the system which traditionally, domain name Registrants query availability, register, transfer, renew, and manage domain name registrations.

Historically, and as shown in FIG. 1, a Registrant, for example a first Registrant 101 may register a domain name with a first Registrar 111 and a second domain name with a second Registrar 112. The first Registrant 101 provides the first Registrar 111 and second Registrar 112 with various contact and technical information that make up the registrations. The first and second Registrars 111,112 maintain records with this information and send it to be stored in with the appropriate Registry, for example the First Registry 121. As mentioned above, a zone file contains domain names, their associated names server names and the IP addresses for those names servers. Thus, the first Registry 121, provides other computers on the Internet 131 the information necessary to access content associated with the domain name. The Registry 121 updates TLD zone files for its respective TLDs. However, the Registry 121 does not interact directly with the Registrant 101. It instead waits for the Registrars 111,112 to pass on any information they are provided by the Registrant.

It is possible for a Registrant to hold rights to several domain names that have the same Top-level Domain (TLD) such as .com or .net, which are tied to the same Registry, however, each domain name may be administered by a different Registrar. In cases where a Registrant has registered multiple domain names with multiple Registrars, should a Registrant want to make a general update (such as an address update) to all of its domain name registrations, the Registrant would be required to send the request to multiple Registrars to do so. The same would be true should the Registrant desire to change nameservers, cancel or renew a domain name, transfer a domain name to another Registrant, or other similar administrative tasks. It therefore might be desirable for a Registrant to consolidate all of its domain names into a single Registrar. In addition, it might also be desirable to provide a more centrally controlled interface allowing a Registrant to process or at least monitor similar changes to multiple domain name registrations all at once, or at least in batches.

The foregoing example of the related art and limitations related therewith are intended to be illustrative and not exclusive. Other limitations of the related art will become apparent to the alert reader upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

One aspect of the present disclosure is to provide a system which allows a user (Registrant) to input domain names it owns (or possibly wants to acquire) into one spot for management, monitoring, and transfer. The domain names may be entered individually or as a batch, for example in a text file list. The system may be hosted or provided by a Registrar. That Registrar may or may not be the Registrar associated with (sponsoring) any of the domain names entered into the system by the Registrant user. Once the domain names are entered into the system, the system identifies which domain names are and are not sponsored by a Registrar host of the system. The system also queries appropriate Registries and identifies the Registrar sponsoring each of the domain names entered. The system may also query appropriate Registries to identify and provide information to the user about the domain names such as create date, expiration date, registration status, etc. A user may utilize the system to monitor the status and information about its domain names regardless of whether a domain name is tied to the Registrar providing the system. The user may also use the system to facilitate domain transfers from other Registrars to the Registrar associated with the system and system database. The transfers may be accomplished manually one at time or through an automated process. The automated transfers may be tied to an expiration date, or batched according to a set frequency. The automated transfers may also be batched or one at a time. This allows a Registrant to transfer a domain name as close to its expiration date as possible, thus minimizing loss of the term already paid for.

In embodiments of the disclosure, an interface may give registrants the ability to: view a list of domain names they control, see domain name details, and request changes to domain names. This may include but is not limited to: changing contact information, changing domain name servers, canceling/deleting a domain name, undeleting a domain name, renewing a domain name, transferring domain name to another Registrant and/or Registrar, Locking/Unlocking domain names, viewing the status of disputes on Registrant's domain names, viewing the request queue and history for Registrant's domain names, canceling pending requests, managing registrant's account, changing passwords, and updating secondary & emergency contact phone numbers.

The Registrant may benefit from the disclosed system because its domain name portfolio has the capability of being maintained and/or monitored in one spot. By being provided with a centralized view of the domains it owns as well as automatic transfer job creation, the Registrant may transfer, and by virtue renew, their domains more easily and at intervals which may spread out the cost of transferring their domains over time rather than all at once. The hosting Registrar may benefit because providing the tool may encourage a Registrant to transfer domain names currently sponsored by a different Registrar to itself.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

The following describes exemplary embodiments and aspects of the present disclosure.

An aspect of the present disclosure provides a system and method for domain Registrants (or other potential users) to monitor their domain names as well as capabilities to initiate a registrar transfer transaction manually or automatically.

Embodiments of the methods of the present disclosure may be carried out with respect to single or multiple domain names associated with ("owned by" or "held by") a Registrant or domain name holder. If a Registrant holds multiple domain names, those multiple domain names may or may not be associated with or sponsored by the same Registrar. Nevertheless, the domain names are contained by TLDs each with an associated zone file. A Registry maintains the zone file associated with each of the TLDs. The TLDs may have domain-name databases and registrar databases associated therewith. The registrar databases and domain-name databases contain records indicative of attributes of the domain names.

Monitoring

Figure 2:
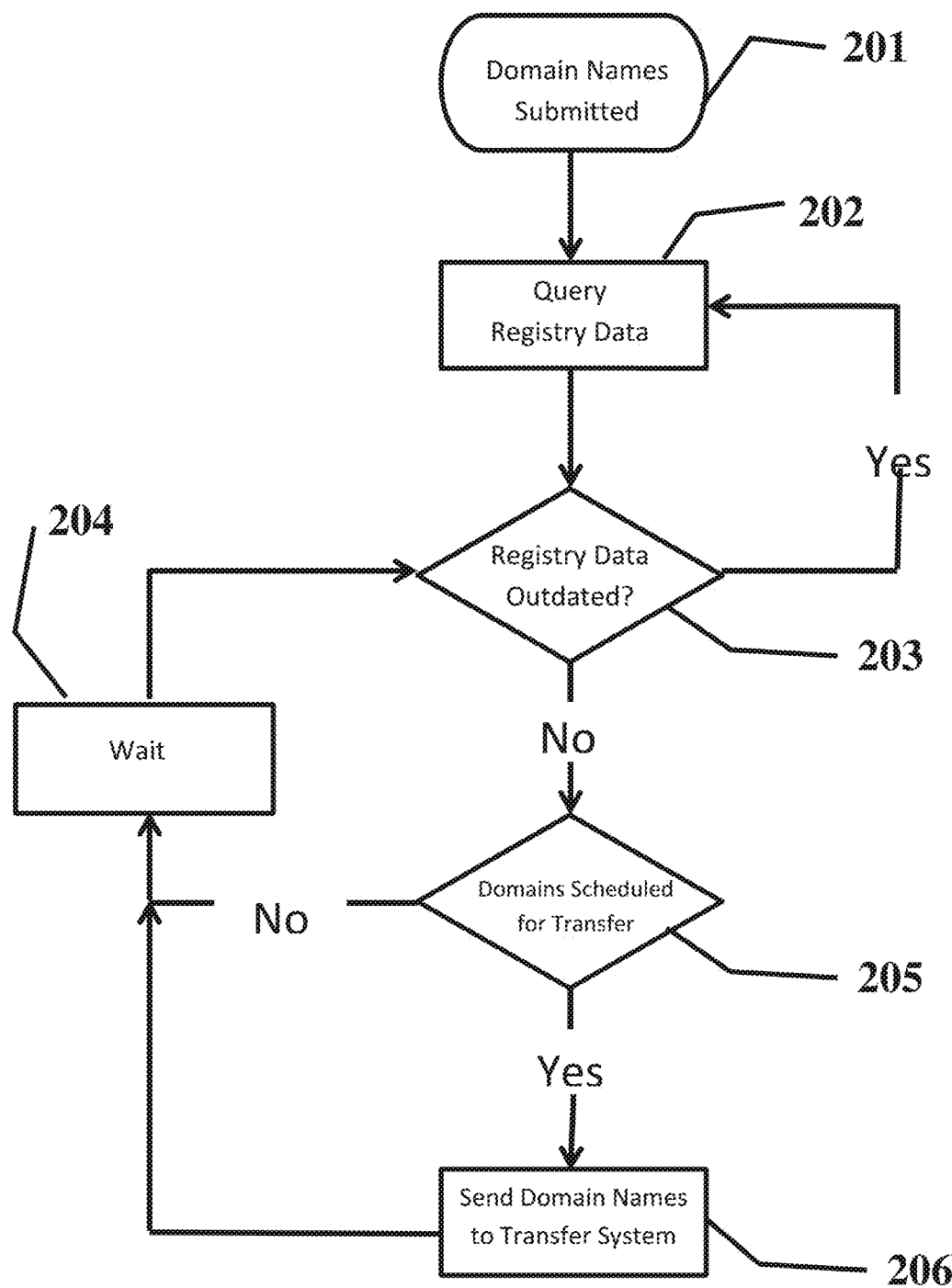
FIG. 2 is a flow diagram showing an exemplary embodiment of the methods of the invention.

In the flowchart of FIG. 2 an aspect of the method of the present disclosure is illustrated. The following steps may occur. A user of the system submits a list of domain names for monitoring 201. The system records domain names that the Registrar provider of the system is not the sponsor. The system queries the authoritative Registry for the status and attributes of the submitted domain names 202. The attributes may include expiration date, current sponsoring registrar, name servers, domain status, etc. Since over time, the queried data likely becomes out of date, mechanisms are in place to allow the data to be re-queried 203. For example, based on an algorithm determined by the expiry date of a domain name, domain names with "stale" data are prioritized and the registry data is re-queried 202.

Transferring

As further shown in the flowchart of FIG. 2, a user of the system may select a domain name or a set of domain names to be transferred to the Registrar provider of the system. The user has the ability to schedule the transfer 205 by manually selecting a domain name or set of domain names or by scheduling an automatic transfer based on various criteria. Determining whether to make a periodic automatic transfer initiation may be based on the following criteria: 1) the amount of time left on the registration period of the domain name, or 2) the periodic frequency of initiating a transfer (for example, once per day, once per week, once per month, bi-monthly). This periodic frequency could also be customized to any specific frequency as desired by the user. A periodic automatic transfer initiation could also be similarly selected for a single domain name. The selected domain names may be grouped into a transfer job and sent to a transfer management portion of the system 206 where domain name transfers are prepared and requests for transfer are sent to the appropriate Registry.

There may be a case that when there are no domain names scheduled to be transferred and there is no need to refresh any of the Registry data. In such a case, the system may wait 204 until such time that one or more of those cases are untrue.

Database Specification

The following SQL database tables are exemplary database tables that may be used to store the data for implementation of the process flow described above.

| Domain_tracker_sql_statements |
|---|

```
-- -- -- -- -- -- -- -- -- -- -- -- -- -- -- -- -- -- -- -- -- -- -- -- -- -- -- -- -- -- -- -- -- -- -- -- -- -- --
-- External Domain Tables                                                                                       --
-- Tables for managing domains that do not live at this registrar                                               --
-- -- -- -- -- -- -- -- -- -- -- -- -- -- -- -- -- -- -- -- -- -- -- -- -- -- -- -- -- -- -- -- -- -- -- -- -- -- --
CREATE TABLE external_domain_status (
   id                               SERIAL PRIMARY KEY,
   name                             TEXT NOT NULL UNIQUE,
   descr                            TEXT
);
CREATE TABLE external_domain (
   id                               SERIAL PRIMARY KEY,
   name                             TEXT NOT NULL UNIQUE,
   status_id                        INT NOT NULL REFERENCES external_domain_status(id)
                                    DEFAULT
ur_id_from_name('external_domain_status', 'pending'),
   reg_create_date                  TIMESTAMP WITHOUT TIME ZONE,
   reg_expire_date                  TIMESTAMP WITHOUT TIME ZONE,
   reg_update_date                  TIMESTAMP WITHOUT TIME ZONE,
   reg_transfer_date                TIMESTAMP WITHOUT TIME ZONE,
   renewed_date                     TIMESTAMP WITHOUT TIME ZONE,
   registrar_identifier_id          INT REFERENCES registrar_identifier(id),
   admin_email                      TEXT,
   whois_data                       TEXT,
   whois_date                       TIMESTAMP WITHOUT TIME ZONE,
   info_date                        TIMESTAMP WITHOUT TIME ZONE
) INHERITS ( inherit_audit );
CREATE INDEX ON external_domain(status_id);
CREATE INDEX ON external_domain(reg_expire_date);
COMMENT ON TABLE external_domain IS
'Domain names and associated information that do not live at this registrar';
COMMENT ON COLUMN external_domain.name IS
'Domain name being monitored';
COMMENT ON COLUMN external_domain.status_id IS
'Status of domain (active, not_registered, etc)';
COMMENT ON COLUMN external_domain.reg_expire_date IS
'Registry expiry date of the domain as of the last info_date';
COMMENT ON COLUMN external_domain.reg_update_date IS
'Registry expiry date of the domain as of the last info_date';
COMMENT ON COLUMN external_domain.reg_create_date IS
'Registry created date of the domain';
COMMENT ON COLUMN external_domain.reg_transfer_date IS
'Registry transfer date';
COMMENT ON COLUMN external_domain.renewed_date IS
'If a renewal is detected, the closest determined renewal date';
COMMENT ON COLUMN external_domain.registrar_identifier_id IS
'registrar identifier record of current registrar as of the last info_date';
COMMENT ON COLUMN external_domain.admin_email IS
'Admin/Registrant contact as of the last info_date';
COMMENT ON COLUMN external_domain.whois_data IS
'Text copy of the whois data used so populate this record';
COMMENT ON COLUMN external_domain.whois_date IS
'Data whois information was retrieved';
COMMENT ON COLUMN external_domain.info_date IS
'Date domain information was last checked';
CREATE TABLE external_domain_registry_status (
   id                               SERIAL PRIMARY KEY,
   external_domain_id               INT NOT NULL REFERENCES external_domain(id)
                                         ON DELETE CASCADE,
   status                           TEXT NOT NULL
);
CREATE INDEX external_domain_registry_status_external_domain_id ON
   external_domain_registry_status(external_domain_id);
COMMENT ON TABLE external_domain_registry_status IS
'Registry statuses attached to an external domain';
CREATE TABLE external_domain_nameserver (
   id                               SERIAL PRIMARY KEY,
   external_domain_id               INT NOT NULL REFERENCES external_domain(id)
                                         ON DELETE CASCADE,
   name                             TEXT NOT NULL
);
CREATE INDEX external_domain_nameserver_external_domain_id ON
   external_domain_nameserver(external_domain_id);
COMMENT ON TABLE external_domain_nameserver IS
'Nameservers attached to an external domain';
```

Domain_tracker_sql_statements

```sql
CREATE TABLE external_domain_scheduled_transfer_period_ types (
    id                          SERIAL PRIMARY KEY,
    name                        TEXT,
    descr                       TEXT,
    UNIQUE(name)
) INHERITS ( inherit_audit );
COMMENT ON TABLE external_domain_scheduled_transfer_period_types IS
'The list of periods transfers can be scheduled';
CREATE TABLE external_domain_group (
    id                          SERIAL PRIMARY KEY,
    account_id                  INT REFERENCES account(id),
    email_reminders             BOOLEAN DEFAULT FALSE,
    email_contact               TEXT,
    email_last_sent             TIMESTAMP WITHOUT TIME ZONE,
    login_token                 CHAR(32),
    scheduled_transfer_period INT REFERENCES
external_domain_scheduled_transfer_period_types(id)
                                DEFAULT NULL,
    scheduled_transfer_mininum_term_left INT,
    UNIQUE(account_id)
) INHERITS ( inherit_audit );
CREATE INDEX ON external_domain_group(email_contact);
CREATE INDEX external_domain_group_token ON external_domain_group (login_token);
COMMENT ON TABLE external_domain_group IS
'A group of domains that do not live at this registrar that are associated with
an account id or outside email address';
COMMENT ON COLUMN external_domain_group.account_id IS
'account_id group of domains are associated with. This is optional,
if account_id is null the group of domain names are not associated with an
existing account but are associated with a 3rd party system and should be
mapped to an account when account holder signs up';
COMMENT ON COLUMN external_domain_group.email_reminders IS
'Flag to determine if email reminders should be sent';
COMMENT ON COLUMN external_domain_group.email_contact IS
'Email address to sent messages to';
COMMENT ON COLUMN external_domain_group.email_last_sent IS
'Timestamp of last sent email';
COMMENT ON COLUMN external_domain_group.login_token IS
'A token to link new users from their email address to their account.';
COMMENT ON COLUMN external_domain_group.scheduled_transfer_period IS
'The period of frequency a transfer is initiated for a set of domain names.
i.e. daily, weekly, monthly'
COMMENT ON COLUMN external_domain_group.scheduled_transfer_mininum_term IS
'The earliest a transfer will be scheduled based on the expiry date of a domain.
For example, if this field is 30, a transfer will not be initiated until the
domain name is inside 30 days from expiry';
CREATE TABLE external_domain_group_domain (
    id                          SERIAL PRIMARY KEY,
    external_domain_group_id    INT NOT NULL REFERENCES external_domain_group(id),
    external_domain_id          INT NOT NULL REFERENCES external_domain(id),
    domain_password             TEXT,
    do_not_transfer             BOOLEAN DEFAULT FALSE
) INHERITS ( inherit_audit );
CREATE INDEX ON external_domain_group_domain (external_domain_id);
CREATE INDEX ON external_domain_group_domain (external_domain_group_id);
COMMENT ON TABLE external_domain_group_domain IS
'Association table between a domain monitoring group and a the list of
monitored domains';
COMMENT ON COLUMN external_domain_group_domain.domain_password IS
'Password for the domain submitted by the account holder. This needs to be here
so the password is exclusive to the account holder and not shared with others
who may be monitoring the same domain';
COMMENT ON COLUMN external_domain_group_domain IS
'A flag to indicate that a user does not want the referenced external domain to
be included in any attempts to initate a transfer of domain names';
INSERT INTO external_domain_status (name, descr) VALUES
('pending', 'Domain has just been submitted and needs an initial scan');
INSERT INTO external_domain_status (name, descr) VALUES
('active', 'Domain is actively being monitored');
INSERT INTO external_domain_status (name, descr) VALUES
('inactive', 'Domain is not actively being monitored');
INSERT INTO external_domain_status (name, descr) VALUES
('tld_not_supported', 'TLD is not yet supported by registrar');
INSERT INTO external_domain_status (name, descr) VALUES
('unregistered', 'Domain name is not registered');
INSERT INTO external_domain_status (name, descr) VALUES
('pending_delete', 'Domain is pending delete');
```

| Domain_tracker_sql_statements |
| --- |
| INSERT INTO external_domain_status (name, descr) VALUES ('at_registrar', 'Domain already exists at this registrar'); INSERT INTO external_domain_scheduled_transfer_period_types (name, descr) VALUES ('day', 'Schedule transfers daily'); INSERT INTO external_domain_scheduled_transfer_period_types (name, descr) VALUES ('week', 'Schedule transfers weekly'); INSERT INTO external_domain_scheduled_transfer_period_types (name, descr) VALUES ('month', 'Schedule transfers monthly'); |

Adding Domain Names

In one embodiment of the present disclosure, a Registrant accesses an interface to a domain tracking and transfer system. A Registrar associated with one or more domain names held by the user is the provider of the system. Upon first use of the domain tracking system, the user may be prompted by the interface to add its domains. The domains may be entered individually, as a list of several domains, as a text file upload, or via other convenient methods. If the user wishes to include a transfer authorization code for a domain name, it may be included with the respective domain at the time it is added to the system. The authorization code entered in this step may later be used by the domain name transfer system, should that particular domain name be added to a transfer job.

The authorization code described above may also be referred to as an AuthInfo Code, an Auth-Info code an auth code, a transfer key, a transfer secret, an EPP code, EPPT authentication code, or EPP authorization code. Without the code, a domain name generally cannot be transferred. The code itself does not approve the transfer, but may serve to identify the Registrant.

Collecting Domain Name Information

In embodiments of the system of the present disclosure, after the user supplies the domain names, the system performs tasks necessary to collect information about each of the domain names which then may be made available in the user interface. The information about each domain name may include: Registrar, Create Date, Expiration Date, Registration Status, Name Servers, Administrative Contact. This information may be periodically updated by the system. The collection of information to update the system may occur on an automated schedule or may occur after a manual request is made. The information collection may be for one or more of the domain names previously entered in the system.

Displaying Domain Name Information

Figure 3:
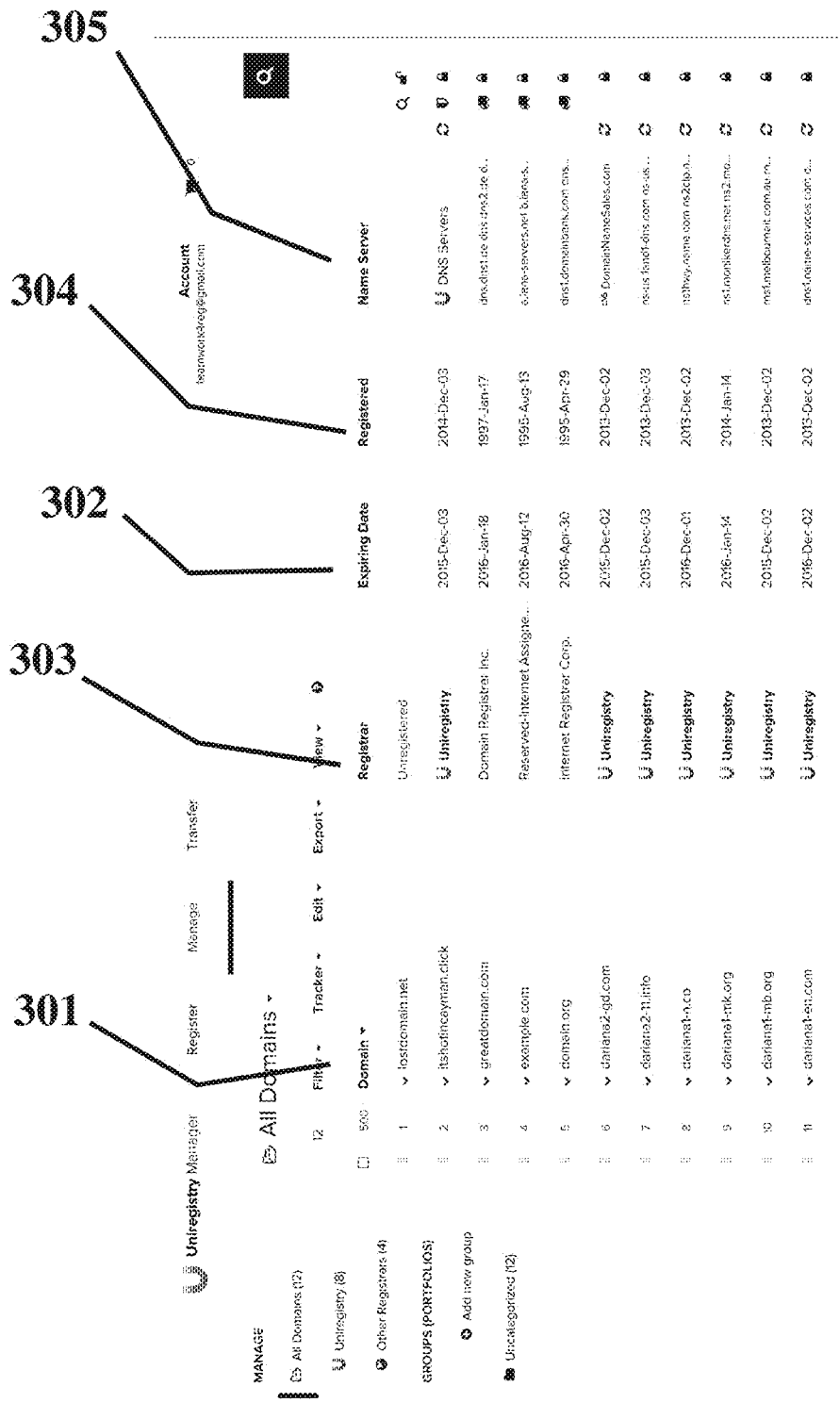
FIG. 3 is a screen shot taken from an exemplary embodiment of a user interface to the system of the disclosure.

After information about the domain name registrations have been obtained and stored in databases associated with embodiments of the system, the user may view the information on a website or other appropriate interface to the system. The information may be presented, for example, as a list of domains with attributes and/or as a summary based on groupings by expiration date. A screen shot of an exemplary display of a list of domains from an exemplary user interface is shown in FIG. 3. Here a list of domain names is shown along with their expiration dates 302, current sponsoring Registrar 303, the date registered 304, and the current name server 305.

The information may be presented in various groupings as well as counts for each category. A grouping may be based on when the domain names expire, for example a user's domains expiring within 10 years, 5 years, 1 year, 180 days, 120 days, 60 days, and 30 days (or other appropriate time frame or range utilized by the industry). Each of these three groupings may then also display the count of domains contained in that group by Registrar or other category. Another exemplary grouping may be one which displays domains recently renewed but not transferred to the Registrar associated with the tracking/transfer system.

Filtering the List of Domain Names

In some aspects of the system of the disclosure, tools may be provided to allow a user to filter a list of domain names to show only domain names that are in the same expiration range or in the same expiration range and are registered at an individual registrar. Additionally, the user may enter a search string that will match any domain name or its attributes and display only those domain names that match.

Initiating Domain Name Transfers

Manual Transfers

A user may select one or more domain names from a list and create a transfer job within the Registrar that is providing the system of the disclosure. In an exemplary embodiment, during the time period a domain name is contained in a transfer job which has not yet been completed, the system of the disclosure may display a status to the user that indicates a registrar transfer is in progress. Additionally, a user may manually initiate a registrar transfer for all domains in any of the summary groupings (for example a grouping by expiration date) by clicking on a transfer button displayed with that grouping.

Automated Transfers

Users may enable a feature within the system of the disclosure that will automatically create a transfer job for domains have an expiration date that falls within a specified number of days, for example, 30, 60, 90, or 120 days. The creation of transfer jobs may occur at weekly intervals and a notice may be communicated to the user by means including by the interface or by email when a new transfer job is created.

Registering Available Domain Names

If a user adds domain names which are not registered and are available to purchase, the user may be able to select these domain names and begin the process of registering them with the Registrar providing the system.

Weekly Summary Emails

In some embodiments of the system of the disclosure, once per week the system may send an email to the user showing a summary of the data being tracked by the system as well as a link to the interface, which may be a website. The intervals of when such an email is sent may vary and the interval may be decided on by the user or may be preset within the system.

Detailed Methods

Figure 1:
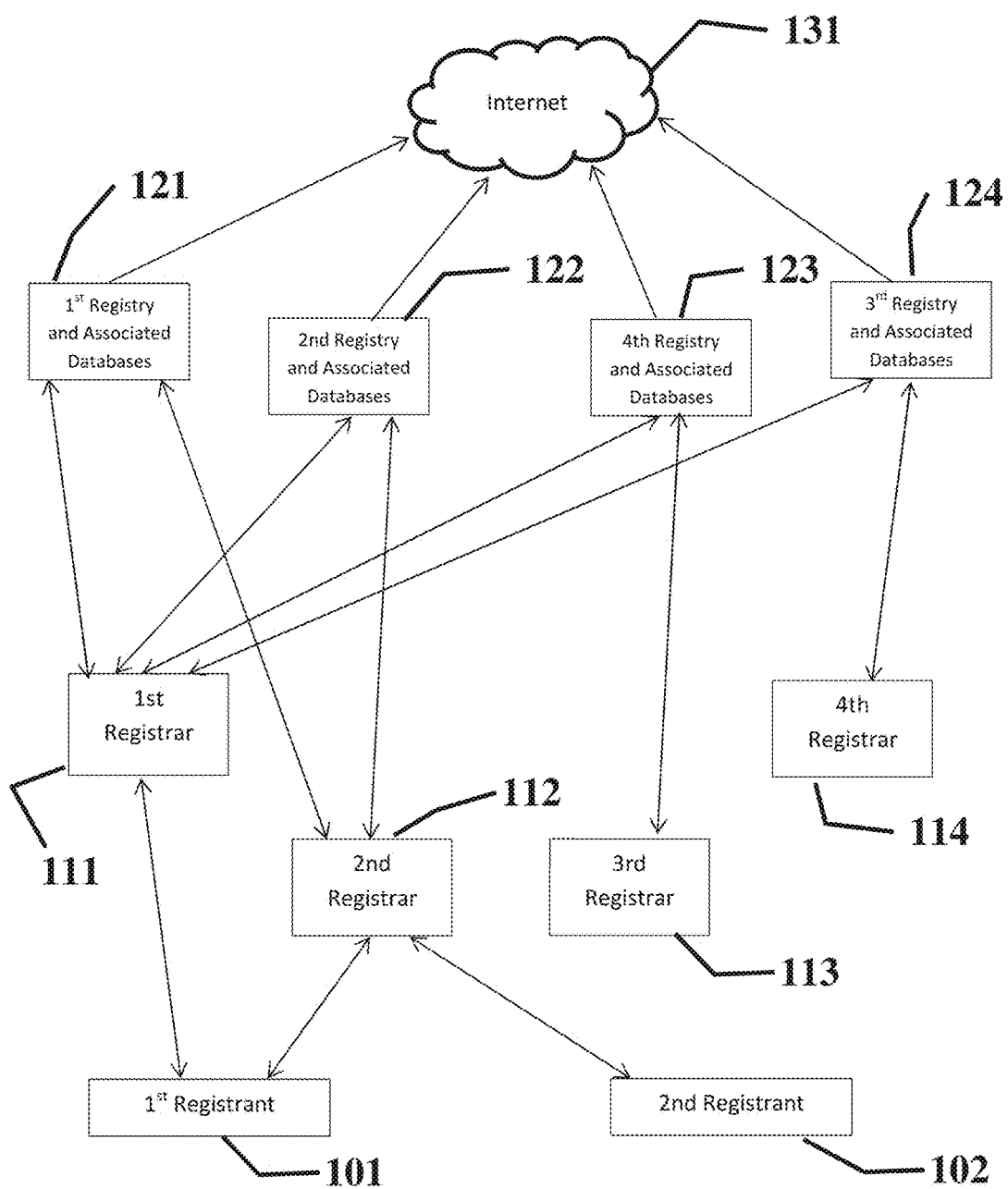
FIG. 1 is an exemplary embodiment of the interaction of the components of the disclosed system and method.

In an aspect of the disclosure illustrated by FIG. 1, the method is carried out with respect to at least a first and second domain name associated (in this example) with a Registrant 101. The first domain name is associated with a respective first Registrar 111. The second domain name is associated with a respective second Registrar 112. The first domain name is contained by a first top-level domain, the first top-level domain having a zone file associated therewith. The first top-level domain has an entity maintaining the zone file associated with the first top-level domain, the entity defining a first Registry 121. The first top-level domain has a first domain-name database associated therewith. The first top-level domain has a first Registrar database associated therewith. The first Registrar database and first domain-name database contain records indicative, for the first domain name, of attributes of the first domain name. The second domain name is contained by a second top-level domain. The second top-level domain has a zone file associated therewith. The second top-level domain has an entity maintaining the zone file associated with the second top-level domain, the entity defining a second Registry 122. The second top-level domain has a second domain-name database associated therewith. The second top-level domain has a second Registrar database associated therewith. The second Registrar database and second domain-name database containing records indicative, for the second domain name, of attributes of the second domain name.

In this aspect of the disclosure, the method include the following steps. The Registrant 101 identifies the first domain name to the first Registrar 111. As discussed above, this identification may be made by typing in a single domain name into a domain name monitoring or tracking system controlled by the first Registrar 111. Optionally the first domain name may be one of several domain names provided on a list. The Registrant 101 identifies the second domain name to the first registrar. Again, the second domain name could be entered individually or as one of a list.

Once at least one of the Registrant's 101 domain names are in the system, the first Registrar 111 sends a first request for information corresponding to at least a first attribute of the first domain name to the first Registry 121. The first Registry 121 receives the request. The first Registrar 111 also may send a first request for information corresponding to at least a first attribute of the second domain name to the second Registry 122. The second Registry receives the request. It may be the case that the first and second Registries 121,122 are actually the same Registry. They also may be different Registries.

The first Registry 121 determines the information corresponding to at least a first attribute of the first domain name. The determination is carried out by extracting information from the first registrar database or the first domain-name database. The first Registry 121 transmits the information corresponding to at least a first attribute of the first domain name to the first Registrar 111. The second Registry 122 determines the information corresponding to at least a first attribute of the second domain name. The determination is carried out by extracting information from the first registrar database or the first domain-name database. The second Registry transmits the information corresponding to the at least a first attribute of the second domain name to the first Registrar 111. The information corresponding to at least a first attribute of the second domain name comprises information identifying the second Registrar 112 as the registrar associated with the second domain name. In this embodiment, the second Registrar 112 is not the same as the first Registrar 111.

The first Registrar 111 communicates the information corresponding to the at least a first attribute of the first domain name and the at least a first attribute of the second domain name to the Registrant 101. This communication may be accomplished through a user interface to a domain monitoring and transfer system as described above.

The method may be further extended by the Registrant 101 requesting the first Registrar 111 to initiate a domain name transfer of the second domain name from the second Registrar 112 to the first Registrar 111. Such a transfer may be governed by the rules of an organization such as ICANN. These rules, as defined by the organization or similar organizations, or regulatory body may be incorporated into the process if necessary. In this embodiment, after the first Registrar 111 receives the transfer request from the Registrant 101, the first Registrar 111 requests the second Registry 122 to request changes the registrar database to reflect the transfer of the second domain name from the second Registrar 112 to the first Registrar 111. After the second Registry 122 receives the request, the second Registry 122 changes the first registrar database to reflect the transfer of the second domain name from the second Registrar 112 to the first Registrar 111.

The method may be further extended by the first Registrar 111 sending a second request for second information corresponding to at least a first attribute of the second domain name to the second Registry 122. The second Registry 122 receives the second request from the first Registrar 111 for second information corresponding to at least a first attribute of the second domain name. The second Registry 122 determines the second information corresponding to at least a first attribute of the second domain name. The determination is carried out with respect to the second registrar database or the second domain-name database. The second Registry 122 transmits to the first Registrar 111 the second information corresponding to at least a first attribute of the second domain name. The second information corresponding to at least a first attribute of the second domain name may comprise information identifying the first Registrar 111 as the registrar associated with the second domain name. The first Registrar 111 communicates the second information corresponding to the at least a first attribute of the second domain name to the registrant 101. This communication may occur through a user interface to a domain monitoring or transfer system as described above.

Embodiments of the methods of the disclosure may be further extended where the request to initiate a domain transfer of the second domain name from the second Registrar 112 to the first Registrar 111 further comprises a schedule for the transfer of the second domain name based on at least a first criteria. Exemplary criteria may correspond to the criteria as described above, including how much time is left before the second domain name expires. The schedule may correspond to a certain number of days prior to an expiry date, for example 10, 15, 20, 30, 60, 90, 120, or 180 days. Alternately, the schedule may correspond to a number of days ranging from 5 to 180 days prior to the expiration of the second domain name. The schedule may also correspond to other measurements of time such as one or more months or one or more weeks prior to the expire date, such as one month, one week, two weeks, three weeks, four weeks, five weeks, six weeks, etc. The changing of the first registrar database to reflect the transfer of the second domain name from the second Registrar 112 to the first Registrar 111 may then also occur at a time corresponding to the schedule for the transfer of the second domain name.

Scheduled transfers may also correspond to a periodic frequency of initiating a transfer of a domain name to the first registrar 111 based on a request from the registrant 101. This period frequency of initiating a transfer could be, for example, once per day, once per week, once per month, once per every six weeks, once per every three months, once per every six months, once per year, etc. The domain transfer system of the disclosure may present a user with selectable options for scheduling transfers based on criteria such as period frequencies or expiry date.

The methods of the disclosure may be further extended as shown in FIG. 1 by receiving at the second Registry 122 a third request from the first Registrar 111 for information corresponding to at least a second attribute of the second domain name. The information corresponding to at least a second attribute of the second domain name is determined at the second Registry 122 and the determination is carried out with respect to the second registrar database or the second domain-name database. The second Registry 122 transmits to the first Registrar 111, the information corresponding to at least a second attribute of the second domain name. In some embodiments, the information may correspond to at least a second attribute of the second domain name which comprises information corresponding to an expiration date of the second domain name.

The method of the disclosure may be further extended wherein the information corresponding to at least a first attribute of the first domain name may comprise one or more of the following attributes: current sponsoring registrar, create date, expiration date, registration status, name servers, or administrative contact.

As shown in the exemplary illustration of FIG. 1, the method of the disclosure may be further extended wherein third and fourth domain names are associated with the Registrant 101. The third domain name is associated with a respective third Registrar 113. The fourth domain name is associated with a respective fourth Registrar 114. The third domain name is contained by a third top-level domain. The third top-level domain has a zone file associated therewith. The third top-level domain has an entity maintaining the zone file associated with the third top-level domain, the entity defining a third Registry 123. The third top-level domain has a third domain-name database associated therewith. The third top-level domain has a third registrar database associated therewith. The third registrar database and third domain-name database contain records indicative, for the third domain name, of attributes of the third domain name. The fourth domain name is contained by a fourth top-level domain. The fourth top-level domain has a zone file associated therewith. The fourth top-level domain has an entity maintaining the zone file associated with the fourth top-level domain, the entity defining a fourth Registry 124. The fourth top-level domain has a fourth domain-name database associated therewith. The fourth top-level domain has a fourth registrar database associated therewith. The fourth registrar database and fourth domain-name database contain records indicative, for the fourth domain name, of attributes of the fourth domain name.

Further to this exemplary method the first Registrar 111 receives information from the Registrant 101 identifying a third domain name. The first Registrar 111 receives information from the Registrant 101 identifying a fourth domain name.

The third Registry 123 receives a first request from the first Registrar 111 for information corresponding to at least a first attribute of the third domain name. The fourth Registry 124 receives a first request from the first Registrar 111 for information corresponding to at least a first attribute of the fourth domain name.

The third Registry 123 determines the information corresponding to at least a first attribute of the third domain name. The determination may be carried out with respect to the third registrar database or the third domain-name database. The fourth Registry 124 determines the information corresponding to at least a first attribute of the fourth domain name. The determination may be carried out with respect to the fourth registrar database or the fourth domain-name database.

Further, the third Registry 123 transmits to the first Registrar 111, the information corresponding to at least a first attribute of the third domain name. The information corresponds to at least a first attribute of the third domain name and may comprise information identifying the third Registrar 113 as the registrar associated with the third domain name. In this as well as some other embodiments, the third Registrar 113 is not the same as the first Registrar 111. The fourth Registry 124 transmits to the first Registrar 111, the information corresponding to at least a first attribute of the fourth domain name. The information corresponds to at least a first attribute of the fourth domain name and may comprise information identifying the fourth Registrar 114 as the registrar associated with the fourth domain name. In this as well as in some other embodiments, the fourth Registrar 114 is not the same as the first Registrar 111.

The first Registrar 111 communicates the information corresponding to the at least a first attribute of the third domain name and the at least a first attribute of the fourth domain name to the Registrant 101. The first Registrar 111 receives a request from the Registrant 101 to initiate a domain transfer of the third domain name from the third Registrar 113 to the first Registrar 111. The first Registrar 111 receives a request from the Registrant 101 to initiate a domain transfer of the fourth domain name from the fourth Registrar 114 to the first Registrar 111. The third Registry 123 receives a request from the first Registrar 111 that the third registrar database be changed to reflect the transfer of the third domain name from the third Registrar 113 to the first Registrar 111. Then the fourth Registry 124 receives a request from the first Registrar 111 that the fourth registrar database be changed to reflect the transfer of the fourth domain name from the fourth Registrar 114 to the first Registrar 111. The third registrar database is changed to reflect the transfer of the third domain name from the third Registrar 113 to the first Registrar 111. The fourth registrar database is changed to reflect the transfer of the fourth domain name from the fourth Registrar 114 to the first Registrar 111.

The third Registry 123 may receive a second request from the first Registrar 111 for second information corresponding to at least a first attribute of the third domain name. The fourth Registry 124 may receive a second request from the first Registrar 111 for second information corresponding to at least a first attribute of the fourth domain name. The third Registry 123 then determines the second information corresponding to at least a first attribute of the third domain name. The determination is carried out with respect to the third registrar database or the third domain-name database. The fourth Registry 124 then determines the second information corresponding to at least a first attribute of the fourth domain name. The determination is carried out with respect to the fourth registrar database or the fourth domain-name database. The third Registry 123 then transmits to the first Registrar 111, the second information corresponding to at least a first attribute of the third domain name. The second information may correspond to at least a first attribute of the third domain name comprising information identifying the first Registrar 111 as the registrar associated with the third domain name. The fourth Registry 124 then transmits to the first Registrar 111, the second information corresponding to at least a first attribute of the fourth domain name. The second information may correspond to at least a first attribute of the fourth domain name comprising information identifying the first Registrar 111 as the registrar associated with the fourth domain name. The first Registrar 111 may then communicate the second information corresponding to the at least a first attribute of the third domain name to the Registrant 101. The first Registrar 111 may further communicate the second information corresponding to the at least a first attribute of the fourth domain name to the Registrant 101. The communication may be through a user interface to a domain monitoring or transferring system controlled or hosted by the first registrar.

It should be appreciated that the Registries described in the example above ($1^{st}$, $2^{nd}$, $3^{rd}$, $4^{th}$, etc. may be the same registries or up to four different registries).

Further to the exemplary method described above, the information received at the first Registrar 111 from the Registrant 101 identifying a first, second, third, and fourth domain name may be provided by the Registrant 101 entering the identifying information individually for each domain name into a user interface to a domain tracking system. Alternatively, the information received at the first Registrar 111 from the Registrant 101 identifying a first, second, third, and fourth domain name may be provided by the Registrant 101 by entering a preformatted list into a user interface to a domain tracking and transfer system.

It should be appreciated that further to the exemplary methods described above, the first Registrar 111 may receive authorization and security codes to initiate a domain name transfer of the second domain name from the second Registrar 112 to the first Registrar 111. This may also be true for the third and fourth domain names.

In various aspects of the methods of the disclosure, the Registries 121, 122, 123,124 associated with domain names at the time they are entered into a domain name monitoring or transferring system may all be the same, or may all be different, or some may be the same, and some may be different. The same is true for the associated Registrars 111, 112, 113, 114.

Figure 4:
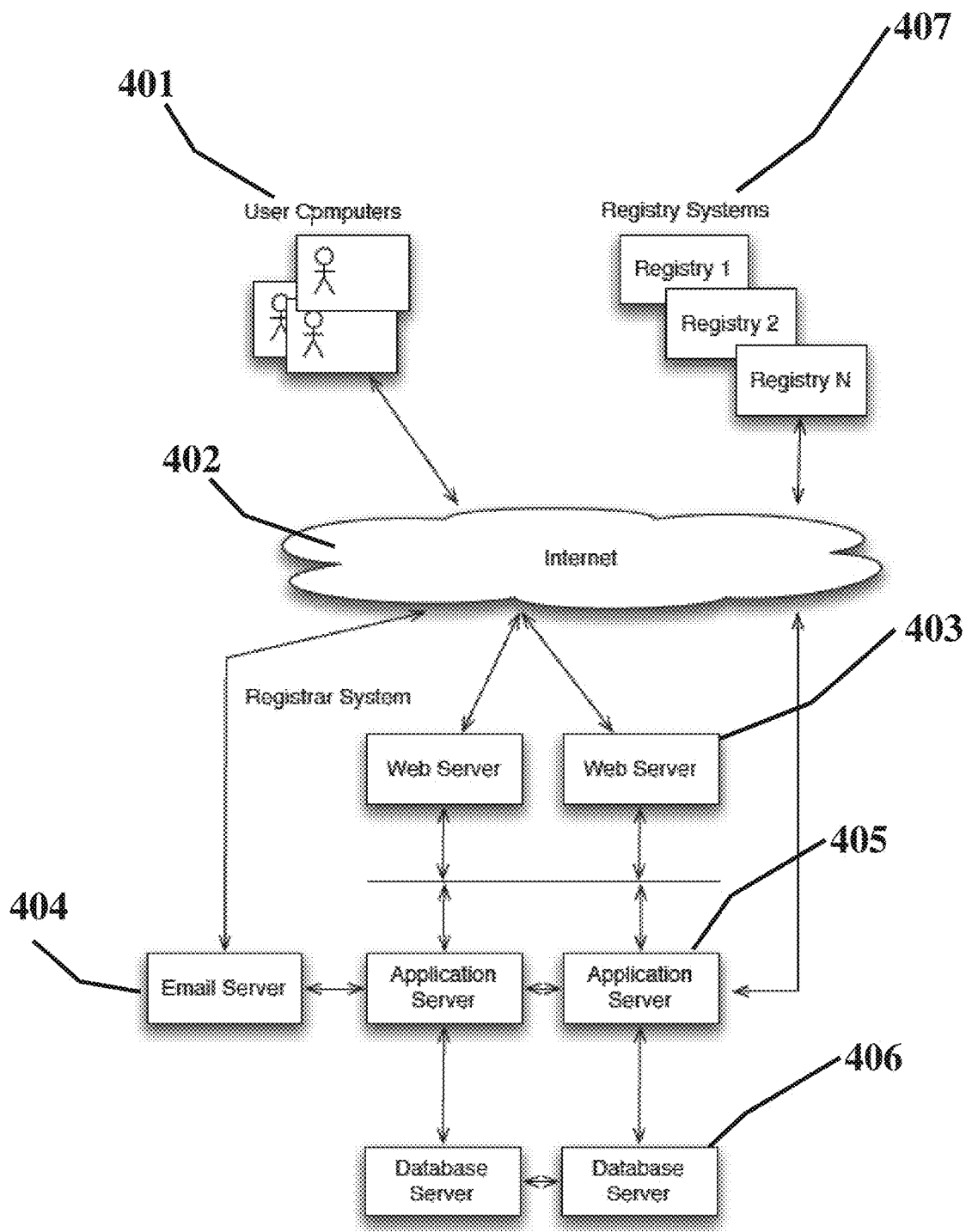
FIG. 4 shows exemplary hardware upon which the various methods of the invention may be carried out.

Embodiments of the method of the disclosure described above may utilize a domain tracking, transfer, or monitoring system and database controlled by a Registrar. As mentioned above, the method of the disclosure may utilize a domain transferring system controlled by the first Registrar. An exemplary implementation of such a system is illustrated in FIG. 4. User computers 401 provide exemplary interfaces with which system users interact with the registrar system. Computer network communication may be facilitated from different devices in different locations over the Internet 402. Web servers 403 may facilitate communication, accept input data, and provide data to user computer devices via, for example, common internet protocol HTTP. Email server 404 may be responsible for sending email to user's registered email addresses over the internet via, for example, the SMTP protocol. Emails may contain notifications of transfer events as well as summaries of the information stored within the database system. Application servers 405 contain the business logic of the transfer system and may be responsible for communicating with the registry systems via an internet connection, storing data in the database system, and providing the email system with email data. The database systems 406 are an exemplary embodiment of where data collected from user inputs and registry systems 407 may be stored and queried.

Figure 5:
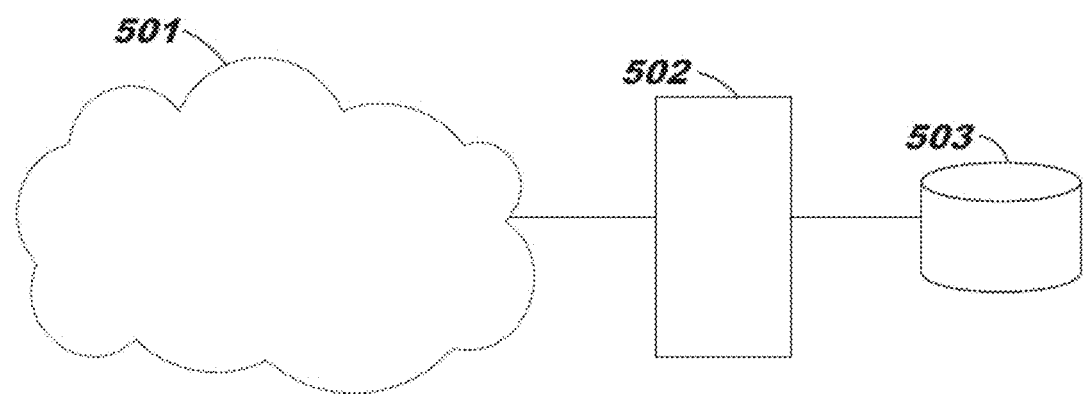
FIG. 5 shows exemplary hardware upon which the various methods of the invention may be carried out.

In addition to the components shown in FIG. 4, FIG. 5 shows exemplary hardware which may be employed to carry out the disclosed materials of the invention. For clarity the hardware is depicted with a processor 502, storage 503, and so on, connected to the Internet 501. Real-life considerations will likely prompt a system designer to implement a more complicated hardware environment. For example the designer will place a firewall (or, more likely multiple levels of protection) between the registry system and the Internet. Nonetheless the general concept is that most of the hardware will usually be selected from general-purpose processors running suitable software, connected with data storage devices such as disk drives or solid-state storage, along with suitable routers, switches, firewalls, and the like.

What will be appreciated by the alert reader is that what has just been described is in many ways better for the Registrant than older approaches. Importantly, with the system just described, the Registrant is able to use a single interface, a single set of mouse clicks, and minor data entry to bring about changes for and monitor multiple domain names. The single interaction with the single interface works out regardless of whether a single Registrar happens to be handling all of the domain names, or whether each domain name is handled by a different Registry.

By providing Registrants with a centralized view of the domains they own and automatic transfer job creation, the user may transfer, and by virtue renew, their domains more easily and at intervals which may spread out the cost of transferring their domains over time rather than all at once.

Miscellaneous policy considerations for embodiments of the invention with respect to registry operators to implement the registrant interface include: WHOIS Privacy policy (possibly provided by the registrars), registrant-initiated change compliance policy, dispute policy and procedures, registrant attribute collection best practices and appearance requirements for registrars, registrant account unlocking and recovering procedures.

While a number of exemplary aspects and embodiments have been discussed above, the alert reader will recognize certain modifications, permutations, additions and sub-combinations therefor. It is therefore intended that the following appended claims hereinafter introduced are interpreted to include all such modifications, permutations, additions and sub-combinations are within their true spirit and scope.

The invention claimed is:

1. A method carried out with respect to at least a first and second domain name associated with a registrant, the first domain name associated with a respective first registrar, the second domain name associated with a respective second registrar, the first domain name contained by a first top-level domain, the first top-level domain having a zone file associated therewith, the first top-level domain having a first entity maintaining the zone file associated with the first top-level domain, the first entity defining a first registry, the first top-level domain having a first domain-name database associated therewith, the first top-level domain having a first registrar database associated therewith, the first registrar database and first domain-name database containing records indicative, for the first domain name, of attributes of the first domain name, the second domain name contained by a second top-level domain, the second top-level domain having a zone file associated therewith, the second top-level domain having a second entity maintaining the zone file associated with the second top-level domain, the second entity defining a second registry, the second top-level domain having a second domain-name database associated therewith, the second top-level domain having a second registrar database associated therewith, the second registrar database and second domain-name database containing records indicative, for the second domain name, of attributes of the second domain name, the method comprising the steps of:

receiving at the first registrar information from the registrant identifying the first domain name;

receiving at the first registrar information from the registrant identifying the second domain name;

receiving at the first registry a first request from the first registrar for information corresponding to at least a first attribute of the first domain name;

receiving at the second registry a first request from the first registrar for information corresponding to at least a first attribute of the second domain name;

determining, at the first registry, the information corresponding to at least a first attribute of the first domain name, the determination carried out with respect to the first registrar database or the first domain-name database;

determining, at the second registry, the information corresponding to at least a first attribute of the second domain name, the determination carried out with respect to the second registrar database or the second domain-name database;

transmitting, by the first registry to the first registrar, the information corresponding to at least a first attribute of the first domain name;

transmitting, by the second registry to the first registrar, the information corresponding to at least a first attribute of the second domain name, wherein the information corresponding to at least a first attribute of the second domain name comprises information identifying the second registrar as the registrar associated with the second domain name, wherein the second registrar is not the same as the first registrar;

communicating by the first registrar, the information corresponding to the at least a first attribute of the first domain name and the at least a first attribute of the second domain name to the registrant;

receiving at the first registrar from the registrant a request to initiate a domain transfer of the second domain name from the second registrar to the first registrar;

receiving at the second registry a request from the first registrar that the first registrar database be changed to reflect the transfer of the second domain name from the second registrar to the first registrar;

changing the first registrar database to reflect the transfer of the second domain name from the second registrar to the first registrar;

receiving at the second registry a second request from the first registrar for second information corresponding to at least a first attribute of the second domain name;

determining, at the second registry, the second information corresponding to at least a first attribute of the second domain name, the determination carried out with respect to the second registrar database or the second domain-name database;

transmitting, by the second registry to the first registrar, the second information corresponding to at least a first attribute of the second domain name, wherein the second information corresponding to at least a first attribute of the second domain name comprises information identifying the first registrar as the registrar associated with the second domain name;

communicating by the first registrar, the second information corresponding to the at least a first attribute of the second domain name to the registrant.

2. The method of claim 1 wherein the request to initiate a domain transfer of the second domain name from the second registrar to the first registrar further comprises a schedule for the transfer of the second domain name based on at least a first criteria, and wherein the changing of the first registrar database to reflect the transfer of the second domain name from the second registrar to the first registrar occurs at a time corresponding to the schedule for the transfer of the second domain name.

3. The method of claim 2 wherein the first criteria corresponds to how much time is left before the second domain name expires.

4. The method of claim 2 wherein the first criteria corresponds to a periodic frequency of initiating a transfer of a domain name to the first registrar based on a request from the registrant.

5. The method of claim 2 further comprising the steps of:

receiving at the second registry a third request from the first registrar for information corresponding to at least a second attribute of the second domain name;

determining, at the second registry, the information corresponding to at least a second attribute of the second domain name, the determination carried out with respect to the second registrar database or the second domain-name database;

transmitting, by the second registry to the first registrar, the information corresponding to at least a second attribute of the second domain name, wherein the information corresponding to at least a second attribute of the second domain name comprises information corresponding to an expiration date of the second domain name.

6. The method of claim 1 wherein the information corresponding to at least a first attribute of the first domain name comprises current sponsoring registrar, create date, expiration date, registration status, name servers, or administrative contact.

7. The method of claim 1 wherein the information corresponding to at least a first attribute of the first domain name is selected from the group consisting of current sponsoring registrar, create date, expiration date, registration status, name servers, or administrative contact.

8. The method of claim 1 wherein third and fourth domain names are associated with the registrant, the third domain name associated with a respective third registrar, the fourth domain name associated with a respective fourth registrar, the third domain name contained by a third top-level domain, the third top-level domain having a zone file associated therewith, the third top-level domain having a third entity maintaining the zone file associated with the third top-level domain, the third entity defining a third registry, the third top-level domain having a third domain-name database associated therewith, the third top-level domain having a third registrar database associated therewith, the third registrar database and third domain-name database containing records indicative, for the third domain name, of attributes of the third domain name, the fourth domain name contained by a fourth top-level domain, the fourth top-level domain having a zone file associated therewith, the fourth top-level domain having a fourth entity maintaining the zone file associated with the fourth top-level domain, the fourth entity defining a fourth registry, the fourth top-level domain having a fourth domain-name database associated therewith, the fourth top-level domain having a fourth registrar database associated therewith, the fourth registrar database and fourth domain-name database containing records indicative, for the fourth domain name, of attributes of the fourth domain name, further comprising the steps of:

receiving at the first registrar information from the registrant identifying a third domain name;

receiving at the first registrar information from the registrant identifying a fourth domain name;

receiving at the third registry a first request from the first registrar for information corresponding to at least a first attribute of the third domain name;

receiving at the fourth registry a first request from the first registrar for information corresponding to at least a first attribute of the fourth domain name;

determining, at the third registry, the information corresponding to at least a first attribute of the third domain name, the determination carried out with respect to the third registrar database or the third domain-name database;

determining, at the fourth registry, the information corresponding to at least a first attribute of the fourth domain name, the determination carried out with respect to the fourth registrar database or the fourth domain-name database;

transmitting, by the third registry to the first registrar, the information corresponding to at least a first attribute of the third domain name; wherein the information corresponding to at least a first attribute of the third domain name comprises information identifying the third registrar as the registrar associated with the third domain name, wherein the third registrar is not the same as the first registrar;

transmitting, by the fourth registry to the first registrar, the information corresponding to at least a first attribute of the fourth domain name, wherein the information corresponding to at least a first attribute of the fourth domain name comprises information identifying the fourth registrar as the registrar associated with the fourth domain name, wherein the fourth registrar is not the same as the first registrar;

communicating by the first registrar, the information corresponding to the at least a first attribute of the third domain name and the at least a first attribute of the fourth domain name to the registrant;

receiving at the first registrar from the registrant a request to initiate a domain transfer of the third domain name from the third registrar to the first registrar;

receiving at the first registrar from the registrant a request to initiate a domain transfer of the fourth domain name from the fourth registrar to the first registrar;

receiving at the third registry a request from the first registrar that the third registrar database be changed to reflect the transfer of the third domain name from the third registrar to the first registrar;

receiving at the fourth registry a request from the first registrar that the fourth registrar database be changed to reflect the transfer of the fourth domain name from the fourth registrar to the first registrar;

changing the third registrar database to reflect the transfer of the third domain name from the third registrar to the first registrar;

changing the fourth registrar database to reflect the transfer of the fourth domain name from the fourth registrar to the first registrar;

receiving at the third registry a second request from the first registrar for second information corresponding to at least a first attribute of the third domain name;

receiving at the fourth registry a second request from the first registrar for second information corresponding to at least a first attribute of the fourth domain name;

determining, at the third registry, the second information corresponding to at least a first attribute of the third domain name, the determination carried out with respect to the third registrar database or the third domain-name database;

determining, at the fourth registry, the second information corresponding to at least a first attribute of the fourth domain name, the determination carried out with respect to the fourth registrar database or the fourth domain-name database;

transmitting, by the third registry to the first registrar, the second information corresponding to at least a first attribute of the third domain name, wherein the second information corresponding to at least a first attribute of the third domain name comprises information identifying the first registrar as the registrar associated with the third domain name;

transmitting, by the fourth registry to the first registrar, the second information corresponding to at least a first attribute of the fourth domain name, wherein the fourth information corresponding to at least a first attribute of the fourth domain name comprises information identifying the first registrar as the registrar associated with the fourth domain name;

communicating by the first registrar, the second information corresponding to the at least a first attribute of the third domain name to the registrant;

communicating by the first registrar, the second information corresponding to the at least a first attribute of the fourth domain name to the registrant.

9. The method of claim 8 wherein the information received at the first registrar from the registrant identifying a first, second, third, and fourth domain name is provided by the registrant entering the identifying information individually for each domain name one by one into a user interface to a domain tracking system.

10. The method of claim 8 wherein the information received at the first registrar from the registrant identifying a first, second, third, and fourth domain name is provided by the registrant by entering a preformatted list into a user interface to a domain tracking system.

11. The method of claim 1 further comprising the step of receiving at the first registrar, authorization and security codes to initiate a domain name transfer of the second domain name from the second registrar to the first registrar.

12. The method of claim 1 wherein the first and second registry are the same.

13. The method of claim 1 wherein the first and second registry are different.

14. The method of claim 1 wherein the method utilizes a domain tracking system and domain tracking system database controlled by the first registrar.

\* \* \* \* \*